J. P. GILL.
TREATMENT OF METALS IN FORGES, &c.
No. 182,456. Patented Sept. 19, 1876.
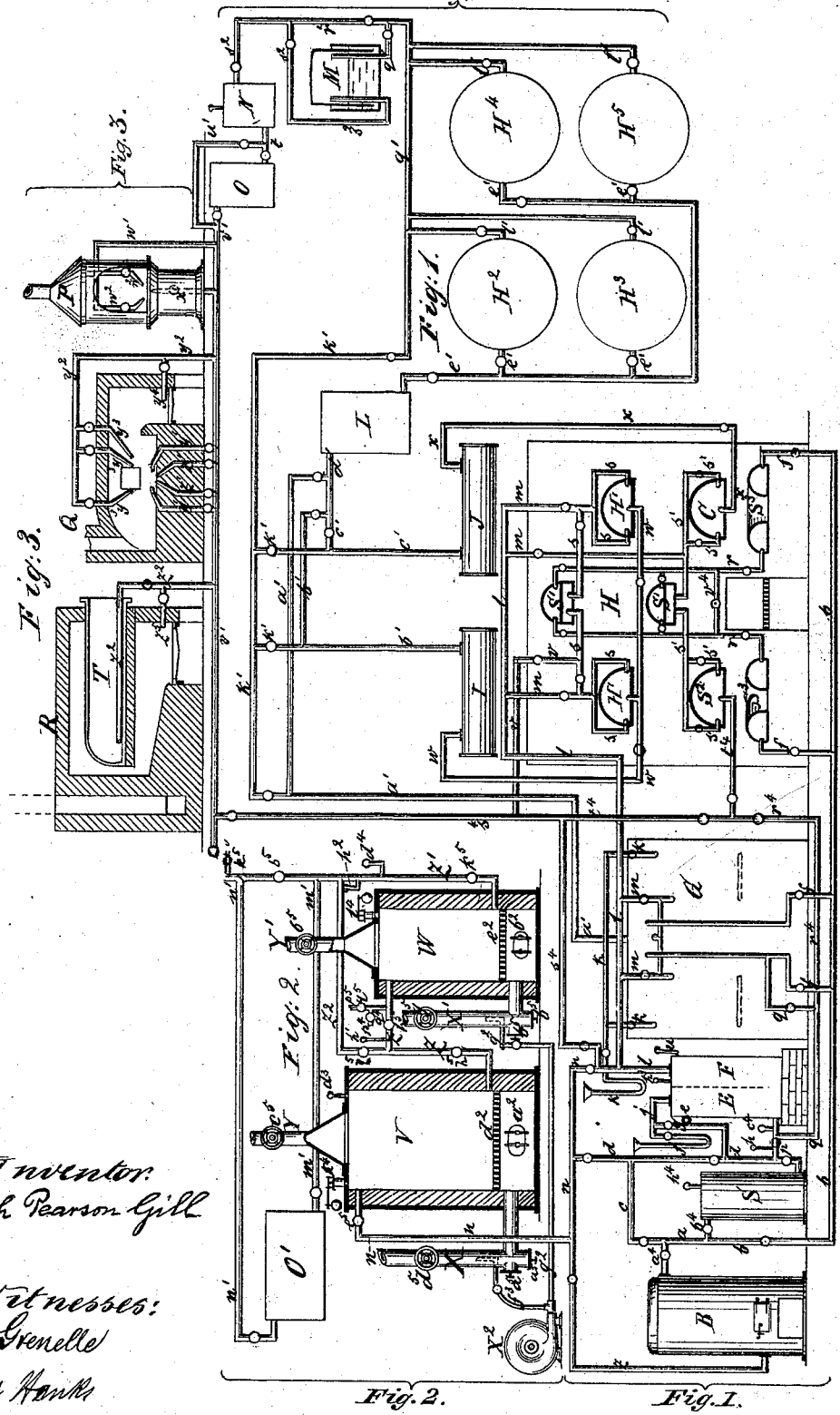

UNITED STATES PATENT OFFICE.

JOSEPH PEARSON GILL, OF NEWARK, NEW JERSEY.

IMPROVEMENT IN TREATMENT OF METALS IN FORGES, &c.

Specification forming part of Letters Patent No. 182,456, dated September 19, 1876; application filed August 21, 1876.

*To all whom it may concern:*

Be it known that I, JOSEPH PEARSON GILL, of the city of Newark, county of Essex, State of New Jersey, have invented certain new and useful Improvements in the Treatment of Metals in Forges, Welding and Reheating Furnaces, and in the manufacture of metals by fagoting, hammering, and rolling; and I do hereby declare that the following is a full, clear, and exact description thereof, which will enable others skilled in the art to which it pertains to understand and use the same.

My invention consists, first, in the direct application of hydrogen gas, either pure or with a small admixture of carbonic-oxide gas, to metals in forges, and welding and reheating furnaces, with or without atmospheric air, and either with or without a carbonaceous fuel, the hydrogen being always in excess, to assist in the welding of the said metals; second, in the direct application of hydrogen vapor or carbureted-hydrogen gas, either with or without hydrogen gas, to the treatment of metals in forges, the hydrocarbon being supplied in regulated proportions, for the purpose of increasing or diminishing the percentage of carbon in the metal, as, for instance, in small manufactures of iron and of steel, such as chisels and other tools; third, in the application of hydrogen gas, carbureted-hydrogen gas, hydrocarbon vapor, superheated steam, carbonic-oxide gas, carbonic-acid gas and air, either hot or cold, in the combinations hereinafter specified, to heated metals in forges, welding and reheating furnaces, and to the manufacture of metals by fagoting, hammering, and rolling, for the purpose of tempering, annealing, welding, and working the metals under treatment.

The hydrogen gas employed by me is the gas chemically known as hydrogen, and is used in a pure or nearly pure state, or with a small admixture of carbonic-oxide gas, except as otherwise specified, it being purified by the means employed and described by me herein.

The apparatus employed by me to produce the gases and vapors, and to distribute them to the forges and furnaces, do not here require description, they being fully described in United States Letters Patent Nos. 171,117, 179,474, and 179,475.

Hydrogen gas is not only applicable to the treatment of ores, minerals, and metals in blast, cupola, malleable, and other furnaces, retorts, and similar apparatus, but it is equally applicable and useful in forges, welding and reheating furnaces for the welding of iron, steel, &c. It is desirable to avoid the use of coal or other carbonaceous substance for fuel, and also the use of atmospheric air when metals are being welded. The carbonaceous element is objectionable on account of its adding to the percentage of carbon in the metal, or rusting it by giving it a coating of carbonate, and in like manner the oxygen in the air rusts the iron, giving it a coating or scale of oxide of iron, both the carbonate and oxide of the metal having to be removed by the use of some fluxing agent, as borax or rosin. A loss of the metal ensues, and a good and expeditious weld is interfered with.

By the employment of hydrogen for the fuel I avoid the carbonaceous element, and, by its use as the purifying agent, I not only remove the oxide when it is formed, but prevent its formation, the hydrogen keeping the surface of the metal clean, insuring a perfect weld and rendering unnecessary the use of borax or other flux. This is particularly valuable in the forging and welding of heavy shafting, as I thereby avoid the formation of a large collection of oxide, which is difficult to remove, and which makes a bad flaw and destroys the strength of the shaft.

When a carbonaceous fuel is used, the hydrogen, being in excess, combines with such portion of the carbon as would unite with the metal, forming a carbureted-hydrogen gas, which escapes or is consumed, adding to the heat. Thus the formation of carbonate is prevented, and which, if formed, is immediately removed. In like manner, the hydrogen being in excess, the oxygen of the air which is admitted into the forge or furnace combines with the hydrogen instead of with the metal.

As a preparation for the welding and tempering of metals, I apply the hydrocarbon gases or vapors in forges to many articles of iron for the purpose of hardening their surfaces, by giving to them a coating of steel. I also, by their use with hydrogen, diminish or increase the percentage of carbon in many articles of manufactured iron and steel, such as chisels and other tools, for the purpose of making them harder or softer, to suit the requirements of the case. This is a useful and valuable adjunct to the tempering of such articles, and also to the welding of them. Trouble is often experienced in tempering steel tools. The steel being too hard or too soft for the purpose, the smith fails to produce the requisite degree of hardness or of toughness. By this method—that is, the direct application of these gases and vapors to the metals in the forge—he has the means at command to make the steel of the required quality, as well as to give it the required tempering.

By the use of hydrogen I diminish the percentage of carbon in the metal, using at times superheated steam in aid of the process. By the use of the hydrocarbons, whether in the state of vapor or of gas, I increase the percentage of carbon in the metal.

By a judicious use of carbonic-oxide gas, and by its conversion into carbonic-acid gas by imparting its carbon to the iron, and by a similar use of carbonic-acid gas, either by withdrawing carbon from the iron forming carbonic oxide, or imparting carbon to it, either of which is under the control of an operator skilled in the art, the treatment of the metal in its various conditions is facilitated.

I withdraw the hydrogen and the carbureted-hydrogen gases, the carbonic-oxide and carbonic-acid gases, from their respective holders by means of a pump having a suitable regulating apparatus, as described in United States Letters Patent No. 179,475, or these gases may be applied directly from their respective retorts by means of said pump and regulating apparatus, and having a small receiver of suitable dimensions interposed, in order that the pump may not act directly upon the retorts. This arrangement obviates the necessity of large holders for the storage of the gases. The superheated steam is supplied directly from the superheaters, and the hydrocarbon vapors from the vaporizers.

I admit these gases and vapors into the forge through the usual or additional air-openings or tuyeres by suitable connecting-pipes, with valves attached to regulate the quantity, or by pipes similarly regulated, and with or without flexible joints to admit the gases and vapors above and upon the metal under treatment in any direction and at any point.

I admit these gases and vapors into the welding and reheating furnaces by means of suitable tuyeres, properly located and inclined so as to make a direct application to the metal in any direction and at any point.

By this process I also treat the iron pile for railroad-bars before welding in the rolls, the operation being identical with the preceding, both as respects the purification and welding.

I also apply the process to the manufacture of wrought-iron from the rough bars, fashioned from the blooms or balls of iron from the puddling-furnace, these rough bars being cut into a number of pieces, which are piled or fagoted together, reheated in a reheating or welding furnace, and welded under the hammer, or in the rolls, into a single bar again.

I also apply it to the manufacture of steel bars from blistered steel, or from shear-steel, in which the bars of blistered or shear steel are piled in fagots, reheated in a reheating or welding furnace, welded and drawn out into bars again under the tilt-hammer or roll; also when the bars of iron or steel are doubled or bent over on themselves, reheated, and welded together.

I also apply the treatment by hydrogen, &c., to the welding of the slabs of iron intended for boiler-plates and tin-plates, the slabs being piled in heaps, heated to a welding-heat, and then welded, by being passed under the rolls. In the ordinary method of making boiler and tin plates, as well as in the manufacture of bars of wrought-iron, steel, &c., the loss of metal is very great, amounting to from ten to twenty per cent. By my method, the work is not only facilitated, but the loss is materially reduced.

I also apply it to the manufacture of butt and lap welded tubes, and flues of all kinds.

The application of the hydrogen, superheated steam, and other agents in the instances last named, is made in a similar manner, and on the same principle as when applied to the forge or more common welding processes. The application is made either in an open furnace, as in a forge, or reverberatory furnace, into which air is admitted to support combustion, but not for treatment, or in a closed vessel, box, or retort, from which atmospheric air is excluded, and the articles are treated in a bath or current of the agent or agents employed, which are admitted to the closed vessel by means of suitable tuyeres or pipes, with valves attached, the whole being constructed in the details to regulate the quantity, velocity, and diffusion of the gases and vapors, as by means of the regulating apparatus, the proper graduation of the working pressure, the relative sizes of the tuyeres or pipes, and their outlets, and the valves attached thereto, which are severally varied and made use of to suit the requirements of such operation.

I place the various articles in a reheating-furnace, either open—in which case I admit air only in the precise quantity necessary to consume the fuel—or closed, from which the products of combustion are excluded. I then heat the articles in a current or bath of hydrogen gas or nitrogen, or hydrogen and air—the air being admitted in definite quantity—to prevent the oxidation or carburation of the metal, and rehammer or reroll them, repeating the process as often as may be necessary.

In the treatment of old and worn iron rails for rerolling, I first heat the pile in a reheating-furnace or closed vessel, subjecting it to a moderate treatment in a current or bath of carbonic-oxide gas, or light hydrocarbon gas or vapor, and then to a current or bath of hydrogen gas, superheated steam and carbonic-acid gas being employed by me at specific intervals to assist in the restoration of the old iron. In this manner the iron of old rails is improved in quality and made valuable in the iron pile.

When the welding and rolling of the bars of iron and steel are finished, I complete the process, when required, by replacing them in a reheating-furnace, in which the products of combustion are not admitted, and give them a treatment with hydrogen, hydrocarbon, carbonic oxide or acid, and superheated steam, as may be required, and as hereinbefore described, to prepare the surface or change the character of the metals, to adapt them to the uses to which they are to be applied.

To anneal wire and all articles of cast-iron, malleable cast-iron, steel, and wrought-iron, I place the articles to be annealed in a closed vessel, similar to that in furnace R in the annexed drawing, or in any annealing-furnace in ordinary use, or otherwise protect them by embedding or covering them with a suitable material, heat them, and allow them to cool in a bath of hydrogen, which I admit into the vessel through pipes in sufficient quantity to exclude the atmospheric air, or I admit the air with the hydrogen in definite and regulated quantity, to avoid the oxidation of the metal.

In addition to the different kinds of apparatus hereinbefore specified for the manufacture and distribution of the hydrogen, carbonic-oxide, and other gases, I also use a cupola or upright furnace or retort heated from within, and similar to the upright retort or vessel designated by $A^7$ in United States Letters Patent No. 171,117, but giving it the downward current described in United States Letters Patent No. 179,474. By the use of this apparatus for the manufacture of the gases I am enabled to dispense with the gas-holders, force-pump, and regulating apparatus, and make and apply the gases directly to the treatment of the metals when and as required; but to this apparatus I make no specific claim herein.

This apparatus is constructed and operated as follows, viz: It is made with a shell or exterior of wrought or cast iron, for the purpose of giving it strength to withstand the pressure of the boiler and furnaces, and is lined with fire-brick or other suitable material.

In Fig. 2, V represents the said furnace or retort, having an ash-pit, with a door or hand-hole, $a^2$, and a grate, $d^2$, formed of material to withstand heat.

These furnaces or retorts may be filled, in whole or in part, with links or pieces or scraps of iron, or with any other metallic or semi-metal substances, or with mineral or carbonaceous materials. The superheated steam is admitted into this vessel, on or near the top, from the boiler or vaporizer through the pipe $n$, having a valve, $e^5$. There is a pipe, Y, with a valve, $c^5$, on the top of the retort, to admit atmospheric air, and a pipe or flue, X, with a valve, $d^5$, to carry off the products of combustion, the said flue having chambers with openings $a^5$ and $a^5$, for the purpose of cleaning it and removing the deposits therein. A pipe, Z, with valve $h^5$, leads from the bottom of the vessel, just above the fire-bars, or in a similar convenient position, to convey or carry off the gases as they are manufactured.

The vessel or retort is first filled or partly filled with the metallic or mineral substances employed, which are heated by the combustion of the carbonaceous mineral substance, when such is used, or by the combustion of the combined superheated steam and hydrocarbon vapors, which are admitted through the pipe $n$, air being admitted at the same time through the valve $c^5$ in the pipe Y, the products of combustion being carried off through the pipe or flue X.

When the contents of the vessel become incandescent and are raised to the proper degree of temperature, the valve $h^5$ is opened and the valves $c^5$ and $d^5$ closed, and the superheated steam which is admitted through the pipe $n$, or the combined superheated steam and hydrocarbon vapors, are decomposed into hydrogen gas and carbonic-oxide gas in their passage through the incandescent material, and the gases thus made are conducted through the pipe Z directly to the furnaces, forges, or other vessels in which metals are to be treated, or to the purifying apparatus or gas-holders, when such are used. When the material in the retort becomes too cool to decompose the steam the valves $d^5$ and $c^5$ are opened and the valve $h^5$ closed, and the combustion of the hydrocarbons is continued until the incandescent mineral or metallic substance in the retort is raised again to the proper temperature, when the valve $h^5$ is opened and the valves $c^5$ and $d^5$ closed, and the manufacture of gas continues as before. To make the process continuous, two of these upright vessels or retorts would be needed and used alternately. The hand-hole $a^2$ is for the purpose of removing the ashes from the ash-pit. All the pipes, joints, and openings are made steam-tight, and of sufficient strength to withstand the working-pressure required to overcome the resistance due to the work to which the gases are applied, the pressure being created in the boiler in which the steam for the manufacture of the gas is generated. There are pressure-gages, as at $d^3$, pyrometers, as at $h^1$, and safety-valves, as at $k^4$. To create sufficient draft, air may be forced into the pipe or flue X by a blower, $X^2$, or any other suitable means. The working-pressure is supplied by the boiler direct to the minerals and metals in their respective furnaces, &c., through the superheater and gas-making apparatus. I vary the pressure in the boiler to adapt it to the process in use, and also regulate it by means of the valves on the connecting-pipes.

In order to produce a pure or nearly pure hydrogen gas, I use a supplementary retort, W, similar to the preceding, but of smaller dimensions, filled with incandescent material, through which I pass the gases produced in retort V by means of the pipe Z, for the purpose of converting the carbonic-oxide gas, which is a product of the decomposition of water, into carbonic-acid gas through the agency of superheated steam, which I admit from a superheater, as at S, through the pipe $p^5$.

The carbonic-acid gas I afterward remove, as required, through the use of lime or other basic purifying material in a purifying apparatus, O'. The steam is decomposed in the presence of the carbonic oxide by the action of the incandescent material, the oxygen combining with the carbonic oxide, forming carbonic-acid gas. This retort is heated from within either by the combustion of the gases produced in retort V, or by the combustion of the combined superheated steam and hydrocarbon vapors, which are admitted through a separate pipe, $p^4$, leading from a vaporizer. There is a pipe, $Z^2$, with valve $l^5$, connecting the outlet-pipe from V with the outlet-pipe from W, to pass the gas to the furnaces, &c., without the intervention of W. I cover these cupola and supplementary retorts with asbestus, or any other suitable non-conducting material, to retain the heat.

I do not confine myself to the special form of these furnaces as herein designated, but claim the use of any other suitable forms and proportions. Neither do I confine myself to the use of the supplementary retort, as herein described, for the purpose of reducing the proportion of carbonic-oxide gas in the production of hydrogen gas, but make use of any suitable form of retort, adapted to any gas works, and heated in the usual manner by external heat. I preferably use the retorts described in United States Letters Patent Nos. 171,117 and 179,474. I admit superheated steam by means of a suitable pipe or passage-way into the entrance of the conducting-chamber through which the hydrogen and carbonic-oxide gases, made in any or either of these retorts, pass from the end of the retort opposite to the mouth-piece to the said mouth-piece or outlet, the said conducting-chamber being filled with incandescent mineral or metallic material, the carbonic-oxide being converted into carbonic-acid gas, as hereinbefore described.

I not only apply the foregoing-described apparatus to the purposes enumerated in this application, but also those described by me in United States Letters Patent No. 179,475.

Steam is admitted from the boiler into the gas-making apparatus in regulated proportions, to produce the gas in such quantities and at such times as it may be needed for use, thereby avoiding the use of a gas-holder, as well as a force-pump. Any excess of gas may be conducted, by means of a suitable valve and pipes, to a storage-holder.

I do not here, broadly, claim the manufacture of hydrogen and other gases under pressure, nor the process of commingling superheated steam with hydrogen and carbonic-oxide gases to diminish the proportion of carbonic oxide, in the manner herein described, they being the subject of another application for a patent for improvements in said manufacture. Nor do I here, broadly, claim the use of the process and apparatus hereinbefore described for the manufacture and delivery of gas under pressure for the general treatment of minerals, ores, and metals, that being the subject-matter of another application for a patent therefor.

I do not here limit or restrict myself to the forms of apparatus now in use for the treatment of metals, and manufactures of metals, suitable and special forms of apparatus, and the uses thereof, forming subjects of further application for patents therefor.

Referring to the annexed drawing, which is hereby made part of this specification, Figure 1 represents a portion of the gas and vapor producing apparatus, &c. The pipes specified all have valves to regulate their use or to disconnect, as indicated in the drawings.

B indicates a boiler. S indicates a superheater. $a$ indicates the pipe leading from boiler to the superheater S. $a^4$ indicates the safety-valve to B. $b^4$ indicates a valve on $a$. E F indicate a vaporizer. G indicates the bench of retorts, &c., vaporizers, and hydraulic main in Fig. 1, United States Patent No. 179,475. $b$ indicates the pipe leading from pipe $a$ to superheaters $S^3$ in bench G, and also in bench H. $f$ indicates the branch pipes from $b$ to superheaters $S^3$. H indicates a bench of retorts containing superheaters and retorts for making hydrogen gas, carbonic-oxide, and carbonic-acid gases. $S^1$ $S^2$ $S^3$ indicate the superheaters in bench H. $H^1$ indicates the retorts for making hydrogen gas. C indicates the retorts for making carbonic oxide and acid gases. I indicates the hydraulic main to retorts $H^1$. J indicates the hydraulic main to retorts C. $p$ indicates the pipe leading from superheater S to vaporizer E F. $h$ indicates the pyrometer on pipe $p$. $c^4$ indicates the pressure-gage on $p$. $h^3$ indicates the pyrometer on vaporizer. $u$ indicates a pressure-gage on vaporizer. $h^4$ indicates a pyrometer on superheater S. $d$ indicates a pipe leading from superheater S to pipe $n$. $e$ indicates a branch pipe from pipe $d$ to vaporizer E F. $g$ indicates a branch pipe from pipe $d$ to pipe $j$. $j$ indicates a siphon-pipe conducting hydrocarbon liquids from a tank to vaporizer E F. $k$ indicates a siphon-pipe conducting hydrocarbon liquids from a tank to vaporizers to bench G. $l$ indicates a pipe leading from vaporizer E F to benches G and H. $m$ indicates the branch pipes from pipe $l$. $n$ indicates the pipe leading from pipe $l$ to cupola or retort V in Fig. 2. $z$ indicates the pipe leading from pipe $n$ to boiler B, to supply hydrocarbon vapors for fuel. $s^4$ indicates the pipe leading from pipe $n$ to pipe $v^1$, Fig. 3, which communicates with the furnaces, forges, &c. $t^4$ indicates the pipe leading from superheater $S^2$ in bench H to pipe $s^4$. $v$ indicates the pipe leading from superheater $S^1$ to $t^4$. $r^4$ indicates the pipe leading from pipe $t^4$ to pipe $q$. $q$ indicates the pipe leading from superheater in bench G to pipe $p$. $r$ indicates the pipes leading from superheaters $S^3$ to superheaters $S^1$ in bench H. $v^4$ indicates the pipe connecting pipes $r$. $s$ indicates the pipes leading from upper superheater $S^1$ to retorts $H^1$. $s^1$ indicates the pipes leading from lower superheater $S^1$ to retorts $S^2$ and C. $w$ indicates the pipe leading from retorts $H^1$ to hydraulic main I. $x$ indicates the pipe leading from retorts C to hydraulic main J. $a^1$ indicates the pipe leading from hydraulic main of bench G to pipe $d^1$. $b^1$ indicates the pipe leading from hydraulic main I to pipe $d^1$. $c^1$ indicates the pipe leading from hydraulic main J to pipe $d^1$. $d^1$ indicates the pipe leading to condensing and purifying apparatus L. L indicates the condensing, purifying, and measuring apparatus, as in Fig. 1, United States Patent 179,475. $e^1$ indicates the pipe leading from L to gas-holder $H^2$ $H^3$ $H^4$ $H^5$. $H^2$ $H^3$ $H^4$ $H^5$ indicate the gas-holders. $l^1$ indicates the outlet-pipes from the several gas-holders. $q^1$ indicates the pipe leading from the outlet-pipes of gas-holders to the the small receiver M. $k^1$ indicates the pipes connecting $a^1$ $b^1$ $c^1$ with $q^1$. N indicates the gas-pump and regulator, as in Figs. 2, 3, and 5, United States Patent No. 179,475. $t$ indicates the outlet-pipe from N leading to O. O indicates the air-receiver, as in $R^2$, Fig. 2, United States Patent No. 179,475. M indicates the small gas holder or receiver. $s^2$ indicates the outlet-pipe from M leading to pump N. $r^1$ indicates the pipe leading from $q^1$ to $s^2$. $u^1$ indicates the pipe leading from outlet of pump N to outlet of receiver O.

Fig. 3 represents several kinds of apparatus for the application of gases and vapors, produced by means of the apparatus described in Figs. 1 and 2, and in United States Patent No. 179,475, to the treatment of minerals, ores, and metals. All pipes have valves attached. $v^1$ indicates the outlet-pipe from O, Fig. 1, leading to the furnaces, forges, &c., and connecting with $Z^1$ the outlet-pipes from the retorts in Fig. 2. P indicates a forge. $x'$ indicates a pipe leading to tuyeres in bottom of forge. $w^1$ indicates a pipe leading to tuyeres or pipes above the forge. $w^2$ indicates the pipes or tuyeres inclined and with movable joints, to apply the gases in an inclined direction, or otherwise, to the materials in the forge. Q indicates a reverberatory, welding, or reheating furnace. $y^1$ indicates the branch pipes to tuyeres entering sidewise to furnace Q. $z^1$ indicates the branch pipes to tuyeres entering in an upward direction to furnace Q. $y^2$ indicates the branch pipes to tuyeres on top of furnace Q. $y^3$ indicates the tuyeres entering Q through the top in an inclined direction. $y^4$ indicates a branch pipe leading into the furnace Q from $y^2$, for the purpose of combustion to heat the furnace. R indicates a furnace containing closed vessels or retorts, for the heating of minerals, ores, and metals free from contact with atmospheric air. T indicates a closed vessel, box, or retort in furnace R. $z^2$ indicates a branch pipe leading into T, for the admission of hydrogen and other gases. $z^5$ indicates a branch pipe from $z^2$ to heat furnace R.

What I claim, and desire to secure by Letters Patent, is—

1. In the treating of metals in forges, welding and reheating furnaces, and in the manufacture of metals by fagoting, hammering, and rolling, the direct application of hydrogen gas, either pure or with a small admixture of carbonic oxide, said gas being applied with or without atmospheric air, and with or without some carbonaceous material for fuel, but always in excess, as and for the purpose set forth.

2. The direct application of carbureted-hydrogen gas or hydrocarbon vapor, in regulated quantity and quality, either with or without hydrogen gas, to the treatment of iron and steel in the forge or a reheating-furnace, either open or closed, as and for the purpose set forth.

3. In the process of treating metals in forges, welding and reheating furnaces, the direct application of hydrogen gas combined with the direct application of carbureted-hydrogen gas or hydrocarbon vapor, in regulated quantities, for the purpose of increasing the percentage of carbon in them, or with the direct application of carbonic-oxide gas or carbonic-acid gas, for the purpose of deoxidizing or decarbureting them, or with the direct application of superheated steam and carbonic-acid gas, to assist in decarbureting them, and also with air either hot or cold, substantially in the manner as herein described, and for the purpose set forth.

4. The process of annealing articles of cast-iron, malleable cast-iron, wrought-iron, and steel, and of other metallic substances, by the direct application of hydrogen gas in a vessel heated in a furnace, and from which atmospheric air is excluded or admitted in regulated quantity, the oxygen of the air uniting with the hydrogen, forming water, and leaving only hydrogen and nitrogen, substantially in the manner as herein described, and for the purpose set forth.

5. In the process of treating metals in forges, welding and reheating furnaces, for the working of the same, the passing in a downward direction of superheated steam, or commingled superheated steam and hydrocarbon vapor, through incandescent mineral or metallic substances, heated in a vertical vessel or retort made steam-tight, and of sufficient strength to resist a high pressure, the said superheated steam or combined superheated steam and hydrocarbon vapors being decomposed in their said passage, and the direct delivery of the resultant hydrogen and other gases from the manufacturing apparatus, with the pressure of the boiler in which the steam is generated, to the forges and furnaces, without the intervention of gas-holders or pumping apparatus, substantially in the manner as herein described, and for the purpose set forth.

6. In the process of treating metals in forges, welding and reheating furnaces, for the working of the same, the commingling superheated steam with hydrogen and carbonic-oxide gases in a retort or in a conducting-chamber in and leading from a retort, the said retort or chamber containing incandescent mineral or metallic substances for the purpose of converting the carbonic-oxide into carbonic-acid gas and diminishing the proportion of the carbonic-oxide gas, substantially in the manner as herein described, and for the purpose set forth.

7. In an apparatus for the treatment of metals in forges, welding and reheating furnaces, a steam-generator, a hydrocarbon-vaporizer, and connected therewith a vessel or retort for converting the steam and hydrocarbon into gas, and a pipe or pipes leading from the said vessel or retort to the forges and furnaces, said apparatus being made steam-tight, and so constructed that the pressure from the steam-generator shall be transmitted to the gas in the converting vessel or retort, and force it through the said pipes to the forges and furnaces, substantially in the manner as herein described, and for the purpose set forth.

8. In an apparatus for the treatment of metals in forges, welding and reheating furnaces, the combination of a boiler, B, a superheater, $S^1$, a hydrocarbon-vaporizer, E F, a retort-bench, G, containing retorts for the manufacture of heating and illuminating gases, a retort-bench, H, containing superheaters $S^1$ $S^2$ $S^3$, and a retort or retorts, $H^1$, for the manufacture of hydrogen gas, a retort, C, for the manufacture of carbonic acid or other gases, hydraulic mains I and J, condensing, purifying, and measuring apparatus L, gas-holders $H^2$ $H^3$ $H^4$ $H^5$, small receiving-holder M, force-pump and regulator N, an air or gas receiver, O, vertical vessels or retorts V and W, blower $X^2$, condensing and purifying apparatus O', forge P, with tuyeres, reverberatory furnace Q and tuyeres, reheating or annealing furnace R, containing a vessel or retort, T, and connecting-pipes, the whole being connected by suitable pipes and valves substantially in the manner as herein described, and for the purpose set forth.

JOSEPH PEARSON GILL.

Witnesses:
M. CHURCH,
FRANK McKENNY.